Dec. 24, 1957  R. L. KECK  2,817,178
SLING-A-BAIT
Filed Jan. 17, 1955  2 Sheets-Sheet 2

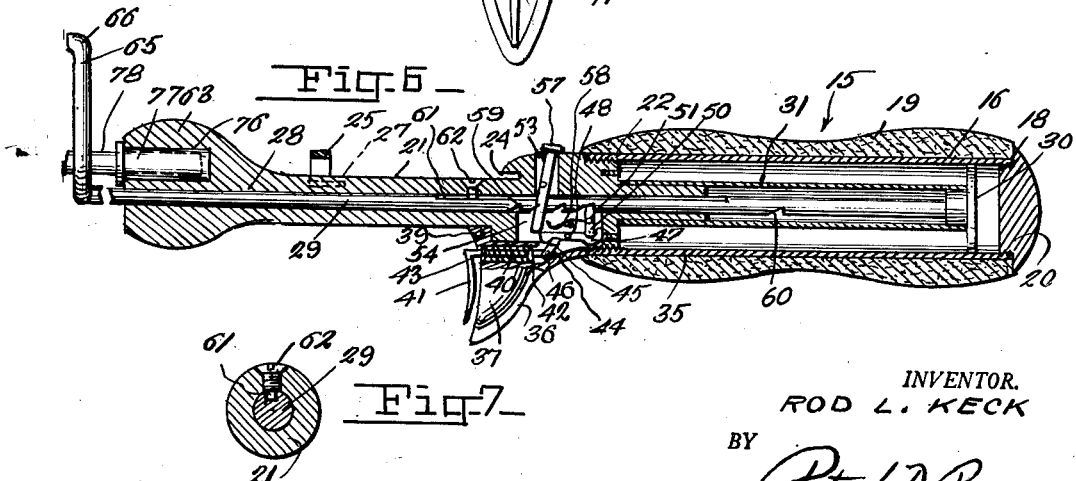

INVENTOR.
ROD L. KECK
BY
Patrick D. Beavers
ATTORNEY

United States Patent Office 2,817,178
Patented Dec. 24, 1957

2,817,178

SLING-A-BAIT

Rod L. Keck, Ravenna, Ohio

Application January 17, 1955, Serial No. 482,218

1 Claim. (Cl. 43—19)

This invention relates to improvements in mechanical bait casters and more particularly to a device which provides means that will accurately cast a bait to any desired point.

While casting is usually referred to as the placing of bait at any desired point to catch a fish, such casting is usually performed on the part of the angler by swinging a fishing rod backwardly and then forwardly so that the fishing line and bait are propelled to the desired point. Careless handling of the fishing rod causes injury at times to fellow anglers and, if trees or boat rigging catch in the fish line, then a poor cast results.

An object of the invention is, therefore, to provide a mechanical bait caster which, attached to a fishing rod, will direct the cast of the bait directly forward in a line extending directly from the outer end of the fishing rod.

The present invention embodies a spring gun which will project the bait and when the bait, which is attached to the fishing line, is projected, will pull such line from the reel as is the usual practice when casting bait.

With the above and other objects and advantages in view, the invention consists of the minor details of construction, arrangement and combination of parts more fully hereinafter described, claimed and illustrated in the accompanying drawings in which:

Fig. 1 is an elevational view of a fishing rod equipped with a mechanical bait casting device embodying the invention;

Fig. 2 is an enlarged longitudinal sectional view of the bait casting device in its released position after the cast has been made, with certain parts broken away;

Fig. 3 is a vertical sectional view on the line 3—3 of Fig. 2;

Fig. 4 is a vertical sectional view on the line 4—4 of Fig. 2;

Fig. 5 is a vertical sectional view on the line 5—5 of Fig. 2;

Fig. 6 is a longitudinal sectional view similar to Fig. 3, with the bait casting device in set or pre-casting position;

Fig. 7 is a vertical sectional view on the line 7—7 of Fig. 6;

Figure 8:
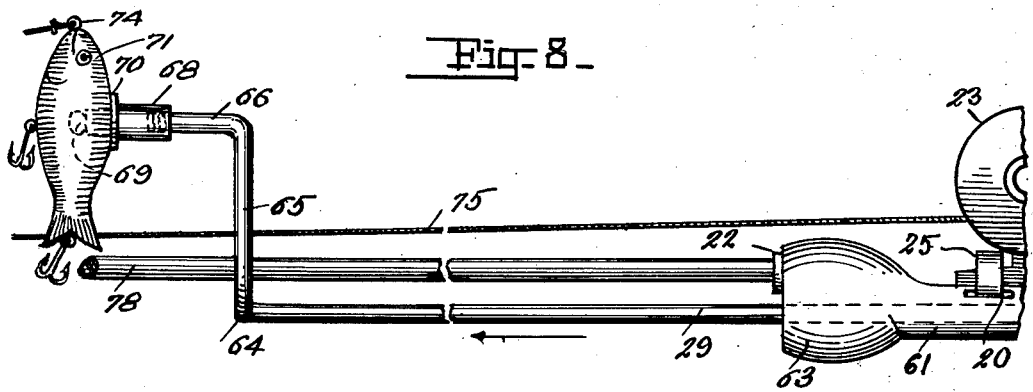
Fig. 8 is an enlarged elevational view of the fishing rod and bait casting device of Fig. 1 more clearly illustrating the manner of mounting the bait on the bait casting device.
Figure 9:
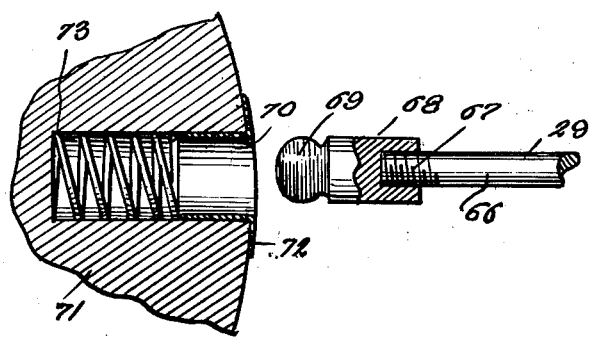
Fig. 9 is an enlarged detailed sectional view of the bait and bait mounting end of the bait casting device.
Figure 10:
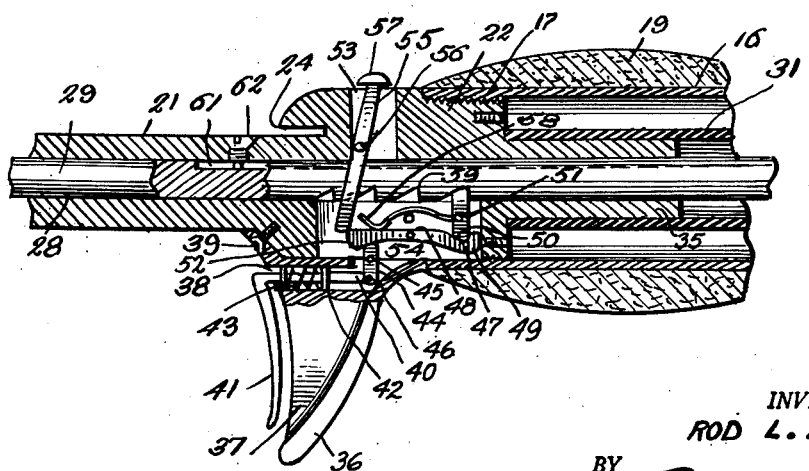
Fig. 10 is an enlarged detailed fragmentary sectional view of the trigger mechanism of the bait casting device.

Referring more in detail to the drawings, wherein like parts are designated by like reference numerals, the bait casting device is generally designated by the reference numeral 15.

The bait casting mechanism comprises a tubular spring housing 16 having an internally threaded end 17 and an internally threaded end 18. Surrounding the spring housing 16 is a molded cork or plastic grip portion 19.

A closure plug 20, having a convex outer face, is screwed into the end 18 of the housing 16 to close that end of the housing.

A reel mounting housing 21 is provided with a reduced externally threaded boss 22 which is engaged with the threaded end 17 of the housing 16.

When a fishing reel 23, as in Figs. 1 and 8, is mounted on the reel mounting housing 21, one end of the reel mount or foot is received in the slot 24, while another end of the reel mount or foot is positioned under the sliding reel latch 25, as shown in Fig. 8.

Viewing Fig. 4 the reel latch 25 is shown to have oppositely disposed, inwardly curved lips 26 that slidably engage in slots 27 in the reel mounting housing 21.

The reel mounting housing 21 has a longitudinally extending bore 28 formed therethrough in which is slidably mounted a plunger rod 29. The inner end of the plunger rod extends into the housing 16 and a plunger disc 30 is mounted on this end of the plunger rod. A tube 31 of resilient rubber is positioned in the housing 16 about the plunger rod 29 and the opposite ends of the tube 31 are secured to the boss 22 and disc 30 by any suitable adhesive. The tube functions as a spring and will, when stretched and then released, give impetus to the rod 29 to cast bait, as will be later described. To prevent the disc from turning in the housing 16 and to limit the movement of the disc 30 within the housing 16 a combination tubular guide and stop 35 is formed integrally with the inner end of the boss 22 in alinement with the bore 28.

Depending below the reel mounting housing 21 is a trigger guard 36. A plate 37 having an opening 38 therein is secured to the guard 36 by a screw fastener 39. The opening 38 receives the stem 40 of a trigger 41. The forward edge of the trigger guard 36 is substantially arcuate in formation and the trigger 41 of a contour to conform to the contour of the forward edge of the trigger guard 36. A collar 42 is fixed to the stem 40 and a tension spring 43 on the stem 40 engages the collar 42 and plate 37 to urge the trigger 41 away from the trigger guard 36. A link 44 is pivoted in the reel mounting housing 21 at 45 and is pivotally connected to the inner end of the stem 40 at 46. The free end of the link 44 engages a cock arm release 47 which is pivotally mounted at 48 in the reel mounting housing 21. The cock arm release 47 has a hooked end 49 which engages the lower end of a cock arm 50 which is pivotally mounted at 51 in the reel mounting housing 21. The opposite end of the cock arm 50 is provided on its lower surface with an enlargement 52 which is adapted to be engaged by the free end of the link 44 as will be later described.

A recess 53 communicates with a recess 54 in which the previously described parts are mounted and a safety member 55 is pivotally mounted at 56 within the recess 53. If a head 57 on the outer end of the safety member is pushed forwardly in the recess 53, the lower end of the safety member 55 will engage the upper surface of the cock arm release 47 to prevent pivotal movement thereof. If the head 57 of the safety member is pushed rearwardly, it will release the cock arm release 47, as will be later described. A spring 58 biases the cock arm 50 into selective engagement with one of a plurality of spaced cocking notches 59 in the plunger rod 29.

In the end of the plunger rod 29 adjacent the end connected to the disc 30, is a recocking slot 60. An elongated slot 61 is engaged by an alinement screw 62 which is threaded into the reel mounting housing 21 until it engages the slot 61. The alinement screw 62 prevents the plunger rod 29 from twisting in the housing to properly aline the cocking notches 59 so that they can be selectively engaged by the end of the cocking arm 50.

As the plunger rod 29 leaves an enlargement 63 on the forward end of the reel mounting housing 21, it has a right angled bend 64, as in Fig. 3. A vertical portion 65 extends upwardly from the bend 64 and a bait mounting portion 66 extends forwardly of the portion 65.

The forward end of the portion 66 is threaded at 67 to receive a bait holding adapter 68, having a rounded knob 69 thereon that will fit into a socket 70 in a bait 71. The socket 70 has an annular circular flange 72 which engages the surface of the bait 71. A spring 73 will engage the knob 69 to hold the bait 71 on the adapter 68.

The bait 71 is otherwise of conventional design having an eye 74 thereon that is connected to the fishing line 75 that is wound on the reel 23. The adapter 68 and socket 70 can be of a size to properly fit the size of the bait to be used.

The enlargement 63 is provided with a recess 76 in which is mounted a bushing 77 in which is removably mounted one end of a fishing or casting rod 78 and the bushing can be of a size to fit any desired size rod.

The device is adapted to be used as a handle for a conventional casting rod and a spinning reel or conventional fishing reel may be mounted on the reel mounting housing 21. However, instead of making a conventional cast to deposit the bait to catch fish, the device is used in the following manner.

The bait 71 is attached to the adapter 68, as shown in Fig. 1 and the portion 65 of the plunger rod 29 is grasped by the angler's hand and pushed inwardly until the cock arm 50 selectively engages one of the cocking notches 59. It being understood that the further the plunger rod is pushed inwardly the more impetus is derived from the rubber tube 31. If it is not desired to cast the bait at the time the plunger rod 29 is pushed inwardly the safety member 55 is pushed forwardly to engage the cock arm release 47.

When it is desired to cast the bait the rod is held at an angle of approximately 60 degrees to the ground or deck of a boat and pointed in the direction it is desired to cast the bait. The safety member 55 is pushed backwardly releasing the cock arm release 47.

The trigger 41 is then pushed inwardly by the finger of the angler, the stem 40 will cause the link 44 to pivot forcing the free end thereof to ride under the enlargement 52 causing the hooked end 49 to release the cock arm 50 from the cocking notch 59 with which it is engaged. (The rubber tube 31 will then impel the plunger rod 29 forwardly.) The force of the forward movement of the plunger rod will cause the bait 71 to be released from the adapter 68 and be cast to the desired location. The bait may be reeled in as desired by means of the reel 23.

To give greater impetus to the bait, coil springs or a tube of greater compression characteristics may be used.

It is believed that from the foregoing description the construction and operation of the device will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A device of the class described comprising a fishing rod including a reel mount housing having a bore formed therethrough and a reduced aft end portion, a tubular hand grip member mounted on the rear end of said housing in spaced relation to said reduced portion, a rod slidably mounted in the bore of said housing and projecting at one end into said tubular hand grip member, a disc affixed to the rear end of said rod, a tube of resilient material surrounding the projecting portion of said rod and connected at one end to said reduced portion and at its other end to said disc in such a manner as to bias the rod in a forward direction, a trigger actuated catch mounted in the housing and adapted to cooperate with means on the rod to hold the same in a cocked position against the biasing action of said resilient tube and a bait receiving means on the other end of said rod.

References Cited in the file of this patent

UNITED STATES PATENTS

| 1,832,727 | Nixon | Nov. 17, 1931 |
| 2,584,678 | Dewey | Feb. 5, 1952 |

FOREIGN PATENTS

| 411,151 | Italy | July 2, 1941 |
| 659,718 | Great Britain | Oct. 24, 1951 |
| 881,119 | France | Apr. 15, 1943 |